No. 822,644. PATENTED JUNE 5, 1906.
E. A. YARNELL.
GAS CHECK PAD.
APPLICATION FILED JUNE 21, 1905.
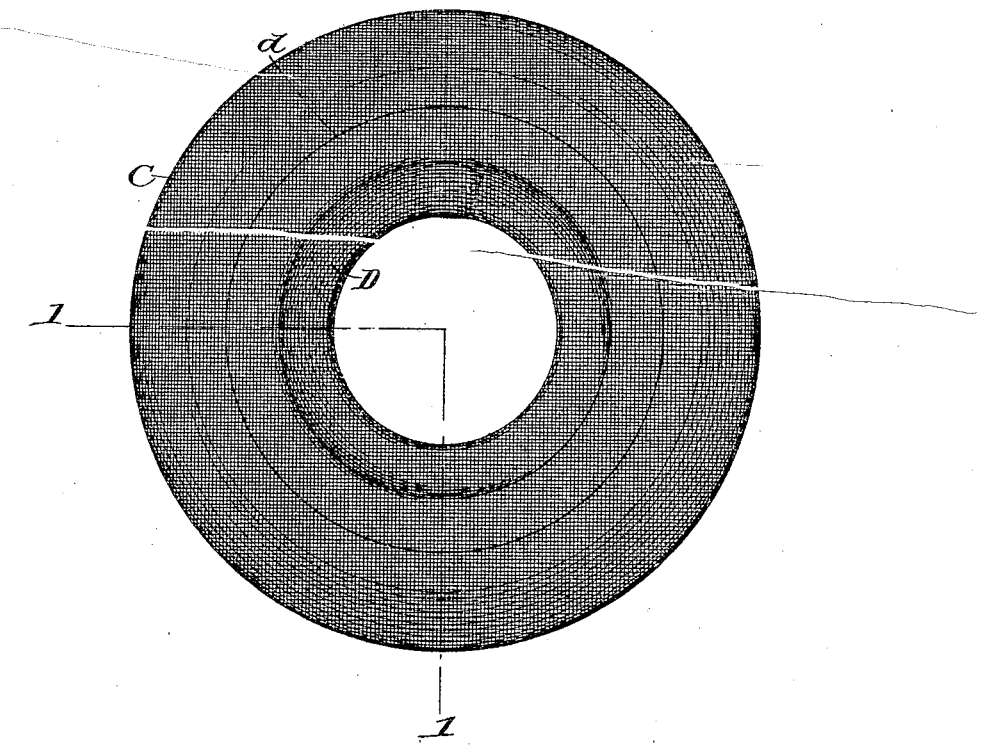
Witnesses:
Eugene A. Yarnell,
Inventor.

UNITED STATES PATENT OFFICE.

EUGENE A. YARNELL, OF WASHINGTON, DISTRICT OF COLUMBIA.

GAS-CHECK PAD.

No. 822,644.           Specification of Letters Patent.           Patented June 5, 1906.

Application filed June 21, 1905. Serial No. 266,264.

*To all whom it may concern:*

Be it known that I, EUGENE A. YARNELL, a citizen of the United States, and a resident of Washington, District of Columbia, have invented certain new and useful Improvements in Gas-Check Pads, of which the following is a full, clear, and exact description.

My invention relates to gas-check pads for breech-loading ordnance; and the objects of my improvements are, first, to provide a pad which will not be injured by the hot powder-gases; second, to provide one which will expand sufficiently to prevent the escape of the powder-gases, yet not sufficiently to cause it to stick in the bore of the gun, thus preventing the removal of the breech-block, and, third, to so simplify the structure as to render it easier and quicker to manufacture. I attain these objects in the structure shown in the drawings, in which—

Figure I is a cross-section on the line I I of Fig. II. Fig. II is a plan view of the pad.

The body or filling of my pad is composed of a plurality of disks A', of asbestos millboard dipped in tallow or other suitable grease. The disks are cut from sheets of the millboard and of such sizes so that when they are assembled and pressed together they form an annular body of substantially the shape shown in the drawings. Pads so constructed of layers are fairly rigid and not easily bent out of shape under pressure, yet they are sufficiently expansible to thoroughly and efficiently seal the space between the breech-block and the bore of the gun at the time of the explosion. The pads in use at present and of which the filling material is composed of a semiplastic mass of asbestos fiber and tallow are often expanded to such a degree under the influence of heat and the enormous pressure exerted that they bind against the bore of the gun, and it is impossible to remove the breech-block until the gun has cooled down. This practically puts the gun out of action and constitutes a very serious handicap; but when the body is composed of layers of asbestos millboard it is not plastic, but under pressure does expand enough to accomplish the objects for which it is used—namely, to seal the breech against the escape of powder-gases.

The cover of my new and improved pad is composed of but two pieces, both of which may be made of asbestos cloth, or only the outer one may be of asbestos cloth and the inner one of canvas or any other suitable material. These two pieces C and D are made from strips sewed together at the ends to form annular pieces. The piece D is placed within the central opening of the pad and the edges carefully stretched and pressed until they fit the surface. The larger piece C is stretched over the pad and the edges fitted down to the surface, which can be easily done, due to the flexibility of the asbestos cloth employed. The two pieces are then sewed together along the lines $c$ and $d$, the pad dipped in tallow, and, if desired or found necessary, it may be pressed to the desired shape. The asbestos cloth which I employ is very closely woven, and thus thoroughly protects the body, so that none of the fibers of the body can come out between the meshes and be worn off. The only part of the cover which comes in contact with the hot powder-gases is a strip around the circumference of the piece C, and therefore the piece D need not necessarily be made of asbestos.

Having thus described my invention, what I claim, and desire to secure by Letters Patent, is—

1. A gas-check pad comprising a suitable cover and a body formed of a plurality of layers of asbestos millboard.

2. A gas-check pad comprising a plurality of layers of asbestos, and a cover composed of two pieces, one of which is asbestos.

3. A gas-check pad formed of a plurality of layers of fibrous non-metallic material and an asbestos cover inclosing the same.

4. A gas-check pad having a suitable body portion made up from a plurality of layers and a cover concealing and protecting the body portion, the said cover being formed from two annular pieces of asbestos.

5. A gas-check pad having a suitable body portion formed substantially from layers of non-metallic fibrous mineral material and having a cover provided with an annular piece fitting the central aperture and a second annular piece fitting the outer circumference.

6. A gas-check pad with a suitable body portion formed substantially from independent yet permanent layers and reinforced by a cover of asbestos material.

7. A gas-check pad having a suitable cover and a body made up of a plurality of layers of non-metallic fibrous material.

Signed at Washington, District of Columbia, this 20th day of June, 1905.

EUGENE A. YARNELL.

Witnesses:
 JNO. WILSON,
 CARRIE YARNELL.